(12) United States Patent
Avrionov et al.

(10) Patent No.: US 10,990,828 B2
(45) Date of Patent: Apr. 27, 2021

(54) KEY FRAME EXTRACTION, RECORDING, AND NAVIGATION IN COLLABORATIVE VIDEO PRESENTATIONS

(71) Applicant: LogMeIn, Inc., Boston, MA (US)

(72) Inventors: Nikolay Avrionov, Santa Barbara, CA (US); Alexander John Huitric, Goleta, CA (US); Nilesh Mishra, Goleta, CA (US)

(73) Assignee: LogMeIn, Inc., Boston, MA (US)

( * ) Notice: Subject to any disclaimer, the term of this patent is extended or adjusted under 35 U.S.C. 154(b) by 0 days.

(21) Appl. No.: 16/587,877

(22) Filed: Sep. 30, 2019

(65) Prior Publication Data

US 2021/0097293 A1    Apr. 1, 2021

(51) Int. Cl.
*G06K 9/00* (2006.01)
*G06F 3/0484* (2013.01)
*H04L 12/18* (2006.01)

(52) U.S. Cl.
CPC ..... *G06K 9/00751* (2013.01); *G06F 3/04842* (2013.01); *H04L 12/1831* (2013.01)

(58) Field of Classification Search
USPC ................. 386/200–234, 239–248, 343–352
See application file for complete search history.

(56) References Cited

U.S. PATENT DOCUMENTS

| | | | |
|---|---|---|---|
| 8,891,939 B2 | 11/2014 | Alexandrov et al. | |
| 9,639,241 B2 | 5/2017 | Penha et al. | |
| 9,857,941 B2 | 1/2018 | Wagner et al. | |
| 9,939,996 B2 | 4/2018 | Beavers et al. | |
| 2004/0263636 A1* | 12/2004 | Cutler | H04N 7/15 348/211.12 |
| 2005/0078868 A1* | 4/2005 | Chen | G06F 16/739 382/171 |
| 2011/0081075 A1* | 4/2011 | Adcock | G06K 9/00751 382/165 |
| 2014/0245152 A1* | 8/2014 | Carter | G09B 5/02 715/720 |
| 2016/0269455 A1* | 9/2016 | Casey | G06F 3/04842 |
| 2019/0042075 A1 | 2/2019 | Bernstein et al. | |

* cited by examiner

*Primary Examiner* — Hung Q Dang
(74) *Attorney, Agent, or Firm* — BainwoodHuang

(57) ABSTRACT

Techniques for performing key frame extraction, recording, and navigation in collaborative video presentations. The techniques include extracting a plurality of frames from media content at a predetermined rate, removing frame areas that do not correspond to a screen area for displaying electronic meeting/webinar content, de-duplicating the plurality of frames, identifying frames that correspond to the "slide type" or similar type of frames, and extracting key frames from the slide type of frames. The key frames can be recorded in a slide deck or other similar collection of key frames, as well as displayed as clickable thumbnails in a UI. By clicking or otherwise selecting a thumbnail representation of a selected key frame in the UI, or clicking-and-dragging a handle of a key frame locator bar to navigate the thumbnails to the selected key frame, users can quickly and more efficiently access desired slide presentation content from an electronic meeting/webinar.

18 Claims, 15 Drawing Sheets

Steps for Creating a Successful Webinar

- Determine objective of webinar
- Choose topic of webinar
- Register webinar attendees
- Encourage registered attendees to participate

*Exploit opportunities for participant engagement!*

*Fig. 2e*

Here's how we can help make your webinar a reality...

*Fig. 2f*

KEY FRAME EXTRACTION, RECORDING, AND NAVIGATION IN COLLABORATIVE VIDEO PRESENTATIONS

BACKGROUND

Participants of electronic meetings and webinars employ various types of electronic devices for establishing wired and/or wireless connections to the electronic meetings/webinars, such as desktop computers, laptop computers, tablet computers, smartphones, and so on. Such electronic meetings/webinars allow their participants to present, receive, and/or share media content (e.g., audio content, video content) through their electronic devices during the electronic meetings/webinars, as well as make and save recordings of the media content, such as for display in a web application, for future reference or review.

SUMMARY

Recordings of electronic meetings and webinars can be made in any suitable digital file format, in accordance with the particular software application used to run the electronic meetings/webinars. For example, with regard to an electronic meeting, a GoToMeeting® recording may be made in the GoToMeeting® codec format, a WebEx® recording may be made in the ".arf" format or ".wrf" format, a Microsoft® Live Meeting recording may be made in the ".wma" format, and so on. Having made a recording of the electronic meeting, the particular software application used to run the electronic meeting can allow the leader or other meeting participant, through a web application, to convert and store the meeting recording in any suitable file format, such as the Moving Pictures Experts Group (MPEG) format, the Apple® QuickTime® Movie (MOV) format, the Windows® Media Video (WMV) format, and so on.

Once the recording of the electronic meeting has been converted and stored, the meeting recording can be played back and viewed, listened to, and/or otherwise consumed using any suitable media player application, such as the QuickTime® media player application, the Windows® media player application, and so on. Such media player applications can have a user interface (UI) that includes a screen area for displaying recorded video, as well as a video scrubber that includes a progress bar with a handle for indicating, along the progress bar, the progress of the recorded video during playback. For example, as playing of the recorded video progresses, the handle of the video scrubber can automatically move in a horizontal direction along the progress bar (e.g., from left to right). Further, a user of the media player application can click-and-drag the handle along the progress bar to the left to navigate (e.g., effectively rewind) the recorded video to an earlier time in the video, or to the right to navigate (e.g., effectively fast-forward) the recorded video to a later time in the video. The user of the media player application can also hover a cursor (e.g., using a mouse, trackpad, or keyboard) over desired points along the progress bar to display the corresponding time (e.g., a timestamp) in the video, as well as an image of a video frame that corresponds to the displayed video time.

Unfortunately, there are drawbacks to navigating recorded media content using a video scrubber of a media player application. For example, such recorded media content embodied as a meeting recording can include not only video content, but also static non-video content such as a slide presentation or other similar presentation, which may have been presented to participants of an electronic meeting via a screen-sharing feature. Such a slide or other similar presentation may be recorded such that multiple duplicate frames of the same slide appear in the meeting recording, and/or one or more frames of each slide in a series of related slides appear in the meeting recording. However, navigating recorded media content to desired static non-video content of a slide or other similar presentation using a video scrubber can be problematic, typically requiring a user to manually and exhaustively search along a progress bar of the video scrubber to view any desired slide or slides.

Techniques are disclosed herein for performing key frame extraction, recording, and navigation in collaborative video presentations. The disclosed techniques can be employed on recordings of media content such as from electronic meetings and webinars, as well as on media content produced, stored, and/or recorded while such electronic meetings/webinars are in-progress. The disclosed techniques can include extracting a plurality of frames from media content at a predetermined rate, in which the media content can include content of an electronic meeting or webinar. The disclosed techniques can further include modifying the content of the respective frames by removing one or more frame areas that do not correspond to a screen area for displaying video and/or static non-video portions of the electronic meeting/webinar content. The disclosed techniques can further include deduplicating the plurality of frames by removing, from one or more sequences of frames, one or more frames having content that is unchanging relative to the first frame in a respective sequence of frames, and differentiating the types of deduplicated frames to identify frames that correspond to the "slide type" or other similar type of frames.

In addition, the disclosed techniques can include extracting, from the identified slide type of frames, key frames to be recorded in a slide deck or other similar collection of frames. Such extraction of key frames can include removing, from at least one sequence of frames in which content is progressively being added, one or more frames prior to the last frame in the sequence in which the content has reached an unchanging (e.g., steady state) condition, designating the last frame in the sequence as a "key frame," and associating the timestamp of the first frame in the sequence with the key frame. The extraction of key frames can further include identifying at least one frame that lacks at least some content of its adjacent previous frame, designating each such identified frame as another "key frame" so long as the identified frame is considered or determined not to be a member of a sequence of frames, and maintaining the association of the key frame with its original timestamp. Once such key frames have been extracted, the key frames and their associated timestamps can be recorded in a slide deck or other similar collection of key frames, as well as displayed as clickable thumbnail images in the UI of a media player application. By clicking or otherwise selecting a thumbnail image representation of a key frame in the UI, or clicking-and-dragging a handle of a key frame locator bar to navigate the thumbnail images to a selected key frame, users can quickly and more efficiently access desired slide or other similar presentation content in a recording of media content, such as from an electronic meeting or webinar.

In certain embodiments, a computer-implemented method of identifying and displaying key frames obtained from media content of an online collaborative session includes extracting a plurality of frames from the media content at a predetermined rate, identifying one or more key frames among the plurality of frames as corresponding to a predetermined type of static non-video frame, and displaying representations of the key frames as clickable thumbnail images in a graphical user interface (GUI).

In certain arrangements, the method includes recording each identified key frame in a slide deck.

In certain arrangements, the method includes downloading a copy of the slide deck.

In certain arrangements, the method includes displaying each identified key frame in the slide deck as a respective clickable thumbnail image in the GUI.

In certain arrangements, the plurality of frames include a plurality of frame sequences, and the identified key frame corresponds to a last frame in a respective frame sequence among the plurality of frame sequences.

In certain arrangements, the method includes, in response to a user's clicking on the respective clickable thumbnail image, displaying, in a screen area of the GUI, a first frame in the respective frame sequence.

In certain arrangements, the plurality of frames include a plurality of frame sequences, and the identified key frame is not a member of any of the plurality of frame sequences.

In certain arrangements, the method includes, in response to a user's clicking on the respective clickable thumbnail image, displaying the identified key frame in a screen area of the GUI.

In certain arrangements, each respective frame among the plurality of frames includes a first frame area for displaying one or more of video and static non-video portions of the media content, and a second frame area for displaying one or more of video and non-video portions of content separate from the media content.

In certain arrangements, the method includes removing the second frame area from each respective frame among the plurality of frames while retaining the first frame area in the respective frame.

In certain arrangements, the plurality of frames include a plurality of frame sequences.

In certain arrangements, the method includes de-duplicating the plurality of frames by removing, from each respective frame sequence among the plurality of frame sequences, consecutive duplicates or copies of a first frame in the respective frame sequence while retaining the first frame in the respective frame sequence.

In certain arrangements, the deduplicated plurality of frames include multiple types of frames.

In certain arrangements, the method includes differentiating the multiple types of frames to identify one or more frames among the de-duplicated plurality of frames that correspond to the predetermined type of static non-video frame.

In certain arrangements, the method includes discarding one or more frames among the de-duplicated plurality of frames that do not correspond to the predetermined type of static non-video frame.

In certain arrangements, the method includes extracting the key frames identified as corresponding to the predetermined type of static non-video frame from the deduplicated plurality of frames.

In certain arrangements, the method includes removing, from each respective frame sequence among one or more frame sequences in which content is progressively being added, each frame occurring prior to a last frame in the respective frame sequence in which the content has reached a steady state condition.

In certain arrangements, the method includes retaining the last frame in the respective frame sequence, and associating a timestamp of a first frame in the respective frame sequence with the last frame in the respective frame sequence.

In certain arrangements, the method includes identifying, from the plurality of frames as corresponding to the predetermined type of static non-video frame, at least one frame that lacks at least some content of its adjacent previous frame, and designating each frame so identified as a key frame so long as the identified frame is not a member of a frame sequence.

In certain arrangements, the method includes maintaining an association of the identified frame with its original timestamp.

In certain embodiments, a system for identifying and displaying key frames obtained from media content of an online collaborative session includes a memory, and processing circuitry configured to execute program instructions out of the memory to extract a plurality of frames from the media content at a predetermined rate, to identify one or more key frames among the plurality of frames as corresponding to a predetermined type of static non-video frame, and to display representations of the key frames as clickable thumbnail images in a graphical user interface (GUI).

In certain arrangements, the processing circuitry is further configured to execute the program instructions out of the memory to record each identified key frame in a slide deck, and to download a copy of the slide deck.

In certain arrangements, the processing circuitry is further configured to execute the program instructions out of the memory to display each identified key frame in the slide deck as a respective clickable thumbnail image in the GUI.

In certain embodiments, a computer program product includes a set of non-transitory, computer-readable media having instructions that, when executed by processing circuitry of a computerized apparatus, cause the processing circuitry to perform a method of identifying and displaying key frames obtained from media content of an online collaborative session, wherein the method includes extracting a plurality of frames from the media content at a predetermined rate, identifying one or more key frames among the plurality of frames as corresponding to a predetermined type of static non-video frame, and displaying representations of the key frames as clickable thumbnail images in a graphical user interface (GUI).

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary session server configured to perform key frame extraction, recording, and navigation within the environment of FIG. 1a;

FIGS. 2e and 2f illustrate a first frame and a second frame, respectively, of the exemplary slide presentation, in which the first and second frames are disposed immediately subsequent to the sequence of frames of FIGS. 2a-2d;

DETAILED DESCRIPTION

Techniques are disclosed herein for performing key frame extraction, recording, and navigation in collaborative video presentations. The disclosed techniques can include extracting a plurality of frames from media content at a predetermined rate, in which the media content can include content of an electronic meeting or webinar. The disclosed techniques further include modifying content of the respective frames by removing frame areas that do not correspond to a screen area for displaying the electronic meeting/webinar content, de-duplicating the plurality of frames, differentiating the types of deduplicated frames to identify frames that correspond to the "slide type" or similar type of frames, and extracting key frames from the identified slide type of frames. Such key frames can be recorded in a slide deck or other similar collection of key frames, as well as displayed as clickable thumbnail images in a user interface (UI) of a media player application. By clicking or otherwise selecting a thumbnail image representation of a key frame in the UI, or clicking-and-dragging a handle of a key frame locator bar to navigate the thumbnail images to a selected key frame, users can quickly and more efficiently access desired slide presentation content in a recording of media content, such as from an electronic meeting or webinar.

Figure 1A:
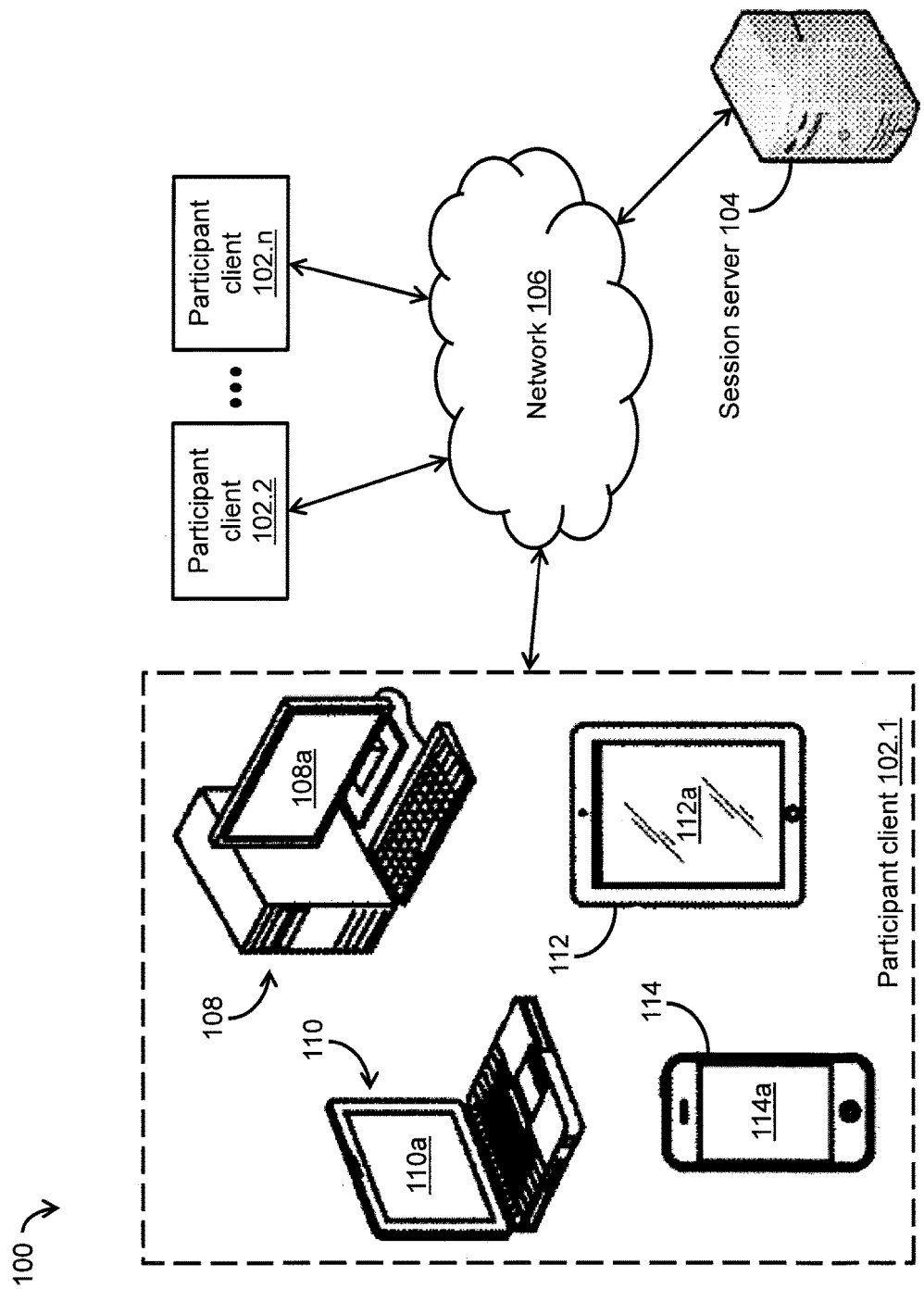
FIG. 1a is a block diagram of an exemplary environment for performing key frame extraction, recording, and navigation in collaborative video presentations.

FIG. 1a depicts an exemplary environment 100 for performing key frame extraction, recording, and navigation in collaborative video presentations. As shown in FIG. 1a, the environment 100 can include a plurality of participant client devices 102.1, 102.2, . . . , 102.n (also referred to herein as the "participant client(s)"), and a session server 104 communicably coupled to the respective participant clients 102.1, . . . , 102.n by wired and/or wireless connections over a communications network 106 (e.g., the Internet). For example, each of the plurality of participant clients 102.1, . . . , 102.n can be configured as a desktop computer 108, a laptop computer 110, a tablet computer 112, a smartphone 114, or any other suitable computer or computerized device. Further, the session server 104 can be configured to initiate, execute, and/or run, in association with the respective participant clients 102.1, . . . , 102.n, an electronic meeting or webinar session, a desktop sharing session, a video conferencing session, and/or any other suitable online collaborative session.

Figure 1B:
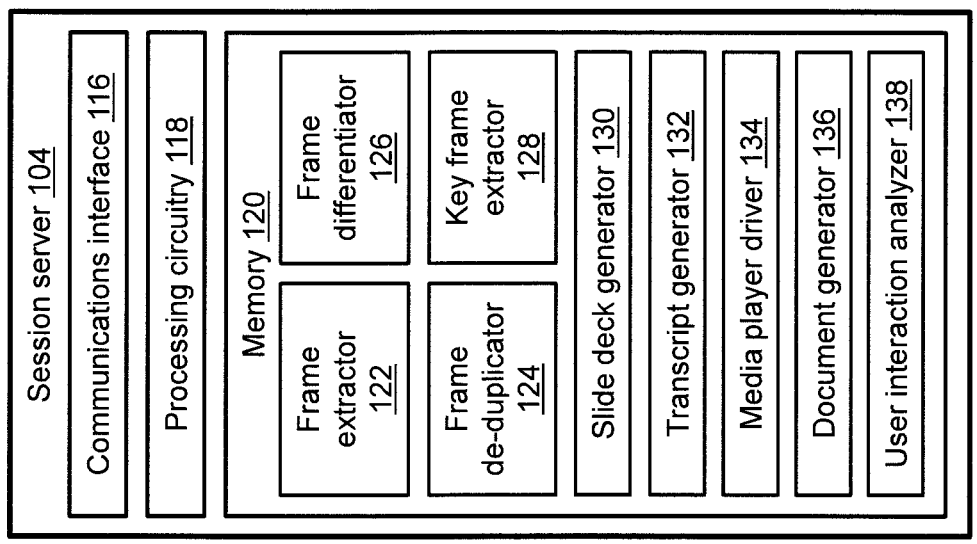

FIG. 1b depicts an illustrative embodiment of the session server 104 of FIG. 1a. As shown in FIG. 1b, the session server 104 can include at least a communications interface 116, processing circuitry 118, and a memory 120. The communications interface 116 can include any suitable network adapter(s) for transmitting and/or receiving electronic, wireless, and/or optical signals over the communications network 106, as well as converting such signals received over the communications network 106 to a form suitable for use by the processing circuitry 118. The memory 120 can include persistent memory (e.g., flash memory, magnetic memory, read-only memory (ROM)) and/or non-persistent memory (e.g., dynamic random access memory (DRAM), static random access memory (SRAM)). Further, the memory 120 can store or otherwise accommodate a variety of specialized software applications or constructs including a frame extractor 122, a frame de-duplicator 124, a frame differentiator 126, a key frame extractor 128, a slide deck generator 130, a transcript generator 132, a media player driver 134, a document generator 136, and a user interaction analyzer 138.

The frame extractor 122 can be configured to perform at least the functions of extracting a plurality of frames from media content at a predetermined rate, in which the media content can include content of an electronic meeting or webinar, and modifying the content of the respective frames by removing one or more frame areas that do not correspond to a screen area for displaying video and/or static non-video portions of the electronic meeting/webinar content. The frame de-duplicator 124 can be configured to perform at least the functions of deduplicating the plurality of frames by removing, from one or more sequences of frames, one or more frames having content that is unchanging relative to the first frame in a respective sequence of frames. The frame differentiator 126 can be configured to perform at least the function of differentiating the types of deduplicated frames to identify frames that correspond to the "slide type" or other similar type of frames. The key frame extractor 128 can be configured to perform at least the function of extracting, from the identified slide type of frames, key frames to be recorded in a slide deck or other similar collection of frames.

The slide deck generator 130 can be configured to perform at least the function of generating the slide deck in which the key frames are to be recorded. The transcript generator 132 can be configured to perform at least the function of generating a transcript by converting words spoken by one or more participant users to text (e.g., speech-to-text conversion) during an online collaborative session (e.g., an electronic meeting or webinar). The media player driver 134 can be configured to perform at least the function of displaying the key frames recorded in the slide deck as clickable thumbnail images in a graphical user interface (GUI), such as the user interface (UI) of a media player application. The document generator 136 can be configured to perform at least the function of generating a document in the portable document format (the "PDF format"), the Microsoft PowerPoint® format (the "PowerPoint format"), or any other suitable format, containing the slide deck, the transcript, or the slide deck with the transcript, for future reference or review. The user interaction analyzer 138 can be configured to perform at least the function of analyzing user interaction data for obtaining insights into participant user engagement with an online collaborative session (e.g., an electronic meeting or webinar). The processing circuitry 118 can include one or more processors configured to execute, out of the memory 120, program instructions pertaining to at least the respective software applications or constructs 122, 124, 126, 128, 130, 132, 134, 136, 138 for performing the various functions described herein.

The disclosed techniques for performing key frame extraction, recording, and navigation in collaborative video presentations will be further understood with reference to the following illustrative example. In this example, it is assumed that participant users of the respective participant clients 102.1, . . . , 102.n (see FIG. 1a) have engaged in an online collaborative session such as an electronic meeting or webinar, and a leader or other participant user has interacted with the session server 104 to make and save a recording of media content produced during the electronic meeting/webinar. For example, the media content recording can include content of the electronic meeting/webinar, such as audio content, video content, and/or static non-video content including slides from a slide presentation or other similar presentation.

The purpose of this example is to illustrate how key frames from a slide presentation can be identified, extracted, and displayed as clickable thumbnail images in a user interface (UI) of a media player application, allowing participant users to quickly and more efficiently access desired slide presentation content contained in a media content recording. As employed herein, the term "key frame" refers to each of one or more selected static non-video frames in a slide or similar presentation, which may have been presented to participant users of an electronic meeting or webinar via a screen-sharing feature. With regard to the various possible embodiments of the participant client 102.1, the desktop computer 108 can include a display screen 108a, the laptop computer 110 can include a display screen 110a, the tablet computer 112 can include a display screen 112a, and the smartphone 114 can include a display screen 114a.

FIGS. 2a, 2b, 2c, 2d, 2e, and 2f depict a sequence of frames (or slides) 213, 215, 217, 218, 220, and 221, respectively, from an exemplary slide presentation included in the media content recording produced during the electronic meeting or webinar. As shown in FIGS. 2a-2d, content is progressively being added to the sequence of slides 213, 215, 217, 218. For example, the slide 213 (see FIG. 2a) includes a title 270 such as "Steps for Creating a Successful Webinar," a first bullet point 272 that contains the statement, "Determine objective of webinar," and a first circular/elliptical illustration 262 that contains the directive, "Generate sales!" The slide 215 (see FIG. 2b) includes the title 270, the first bullet point 272, and the first circular/elliptical illustration 262, as well as a second bullet point 274 that contains the statement, "Choose topic of webinar," and a second circular/elliptical illustration 264 that contains the directive, "Improve online collaborations!" The slide 217 (see FIG. 2c) includes the title 270, the first bullet point 272, the second bullet point 274, the first circular/elliptical illustration 262, and the second circular/elliptical illustration 264, as well as a third bullet point 276 that contains the statement, "Register webinar attendees," and a third circular/elliptical illustration 266 that contains the directive, "Register now!" The slide 218 (see FIG. 2d) includes the title 270, the first bullet point 272, the second bullet point 274, the third bullet point 276, the first circular/elliptical illustration 262, the second circular/elliptical illustration 264, and the third circular/elliptical illustration 266, as well as a fourth bullet point 278 that contains the statement, "Encourage registered attendees to participate," and a fourth circular/elliptical illustration 268 that contains the directive, "Participate live!"

Figure 2A:
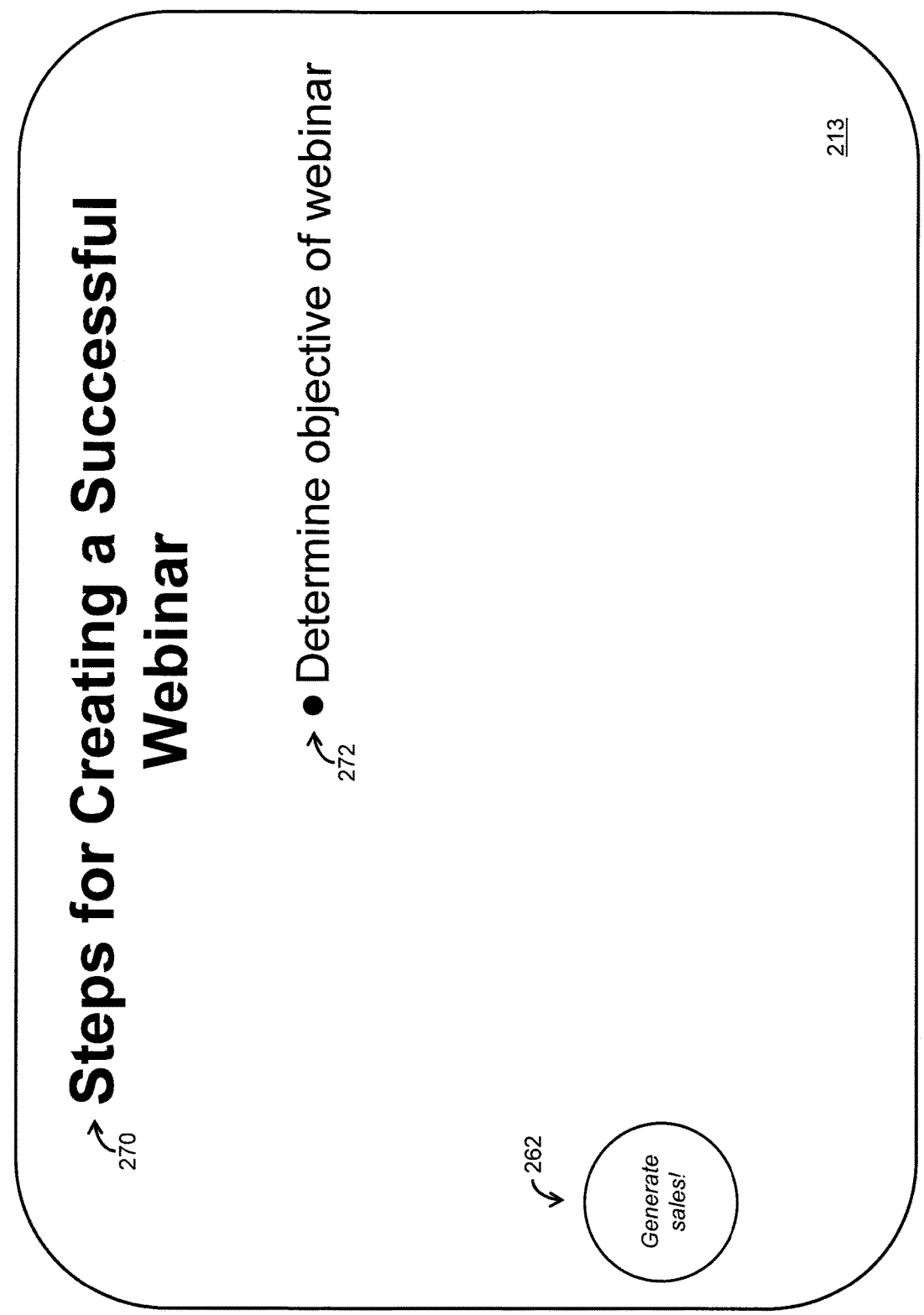
FIGS. 2a-2d illustrate a sequence of frames in an exemplary slide presentation, in which content is progressively being added to each sequential frame.
Figure 2B:
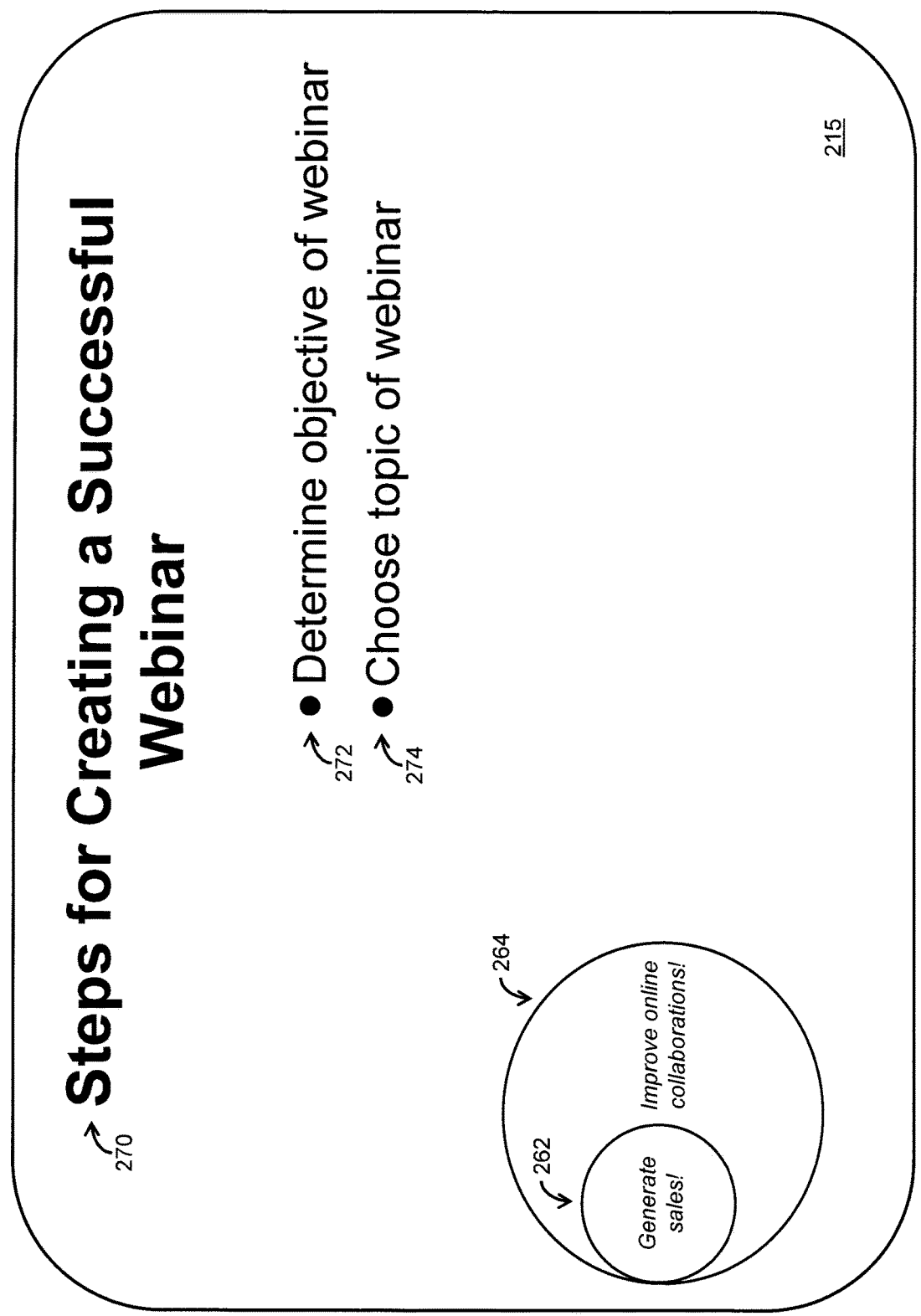
Figure 2C:
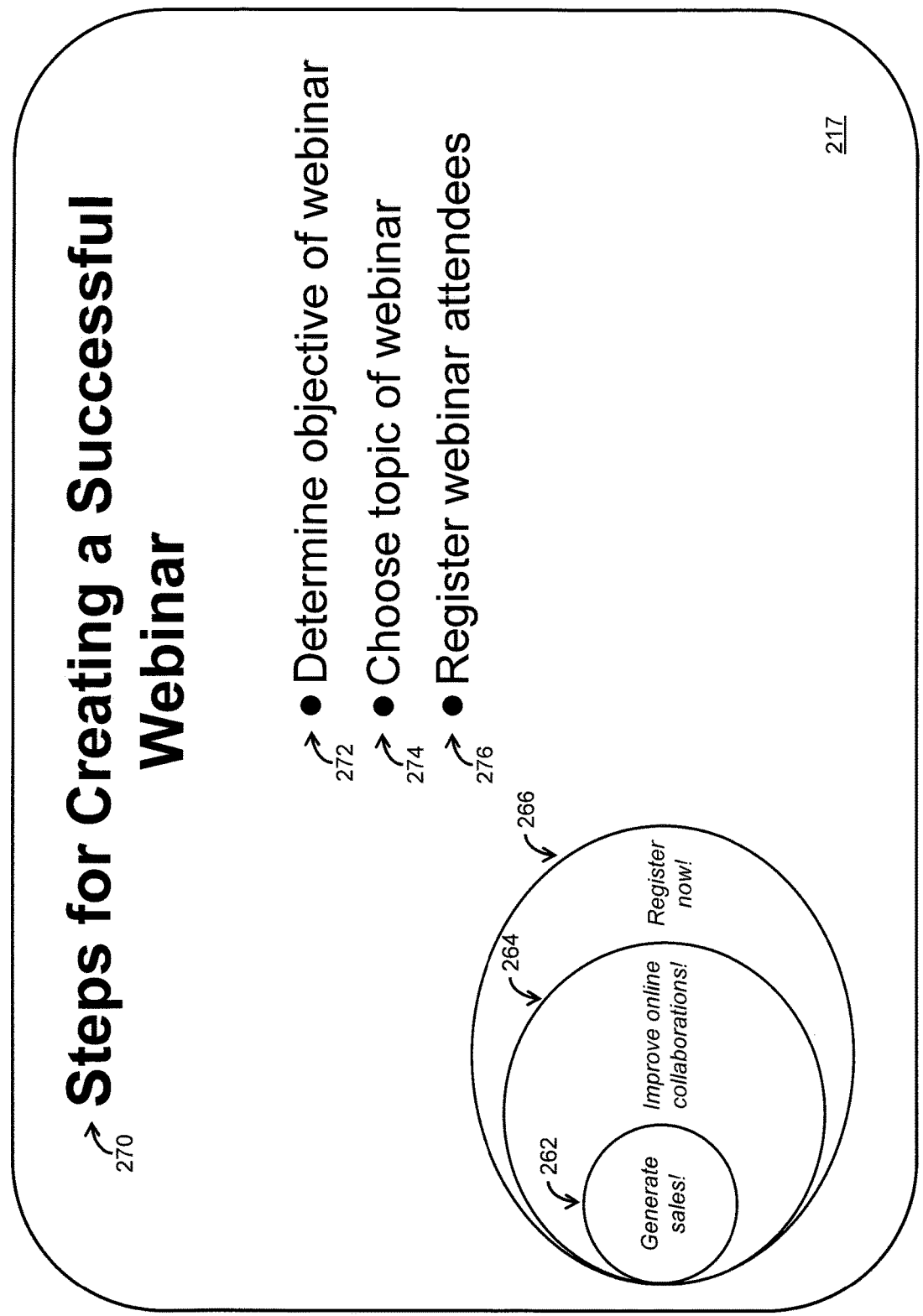
Figure 2D:
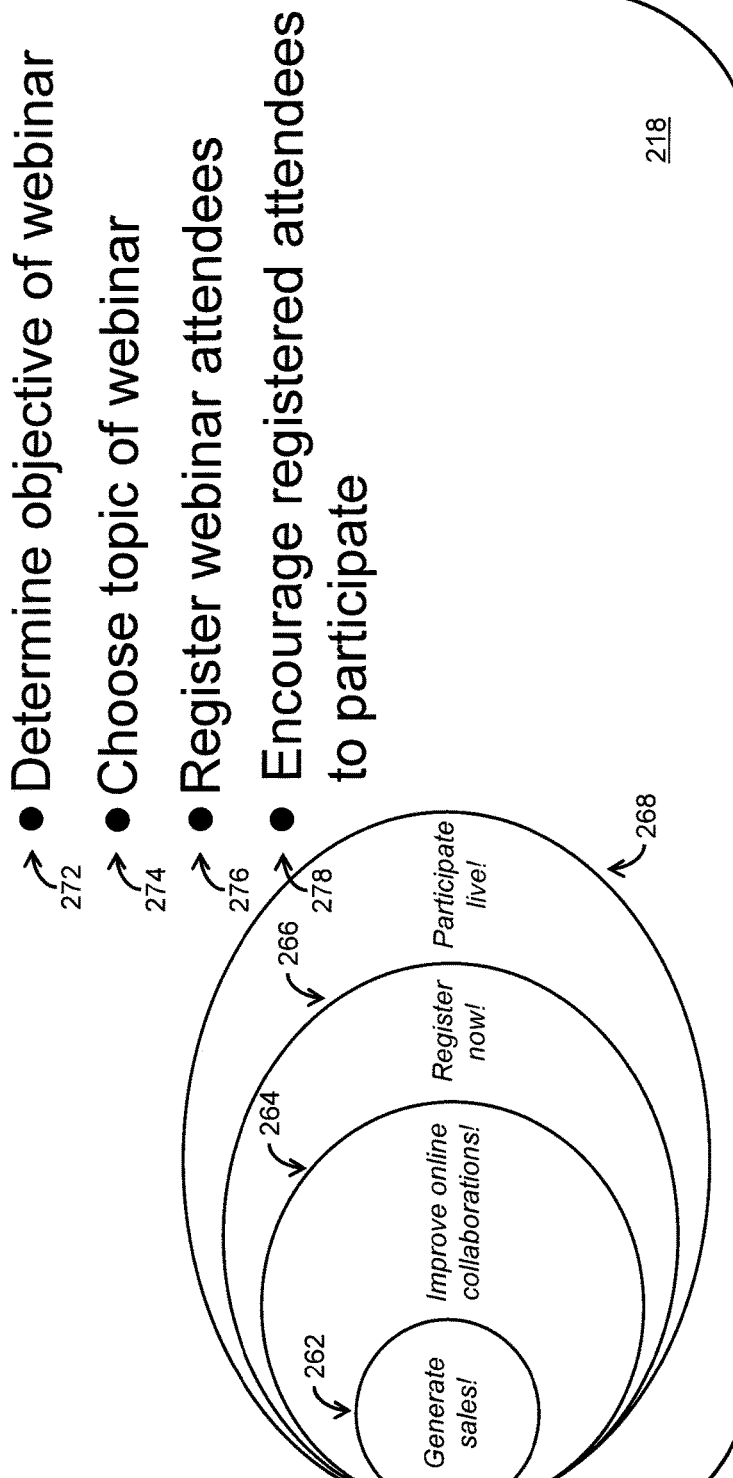

The slide 220 (see FIG. 2e) includes the title 270, the first bullet point 272, the second bullet point 274, the third bullet point 276, and the fourth bullet point 278, as well as a new directive 280, "Exploit opportunities for participant engagement!" However, the slide 220 lacks the first circular/elliptical illustration 262, the second circular/elliptical illustration 264, the third circular/elliptical illustration 266, and the fourth circular/elliptical illustration 268 (see FIG. 2d). In other words, the content pertaining to the first circular/elliptical illustration 262, the second circular/elliptical illustration 264, the third circular/elliptical illustration 266, and the fourth circular/elliptical illustration 268, which was included in the slide 218 (see FIG. 2d), has effectively been removed from its adjacent subsequent slide 220 (see FIG. 2e). It is noted that, in this example, the slide 218 is considered to have reached an unchanging (e.g., steady state) condition relative to the previous slides 213, 215, 217 in the same sequence of slides.

The slide 221 (see FIG. 2f) includes a new title 282, but lacks the title 270, the first bullet point 272, the second bullet point 274, the third bullet point 276, the fourth bullet point 278, and the new directive 280. In other words, the content pertaining to the title 270, the first bullet point 272, the second bullet point 274, the third bullet point 276, the fourth bullet point 278, and the new directive 280, which was included in the slide 220 (see FIG. 2e), has effectively been removed from its adjacent subsequent slide 221 (see FIG. 2f). In this example, because the slide 221 lacks at least some content of its adjacent previous slide 220, the slide 220 is considered or determined not to be a member of a sequence of frames (or slides).

As noted herein, the purpose of this example is to illustrate how key frames from a slide presentation can be identified, extracted, and displayed as clickable thumbnail images in a UI of a media player application. To that end, the session server 104 (see FIG. 1b) operates on the media content recording that includes the slide presentation with the sequence of frames (or slides) 213, 215, 217, 218, 220, 221, as follows. First, the frame extractor 122 (see FIG. 1b) extracts a plurality of frames from the media content recording at a predetermined rate, in which the media content recording includes content of the electronic meeting or webinar. For example, if the media content recording is 100 seconds in length (or any other suitable length), then the frame extractor 122 can extract the plurality of frames from the media content recording at the predetermined rate of one (1) frame per second (fps) (or any other suitable rate). The frame extractor 122 can also modify the content of the respective frames by removing one or more frame areas that do not correspond to a screen area for displaying video and/or static non-video (e.g., slide) portions of the electronic meeting/webinar content.

Figure 3:
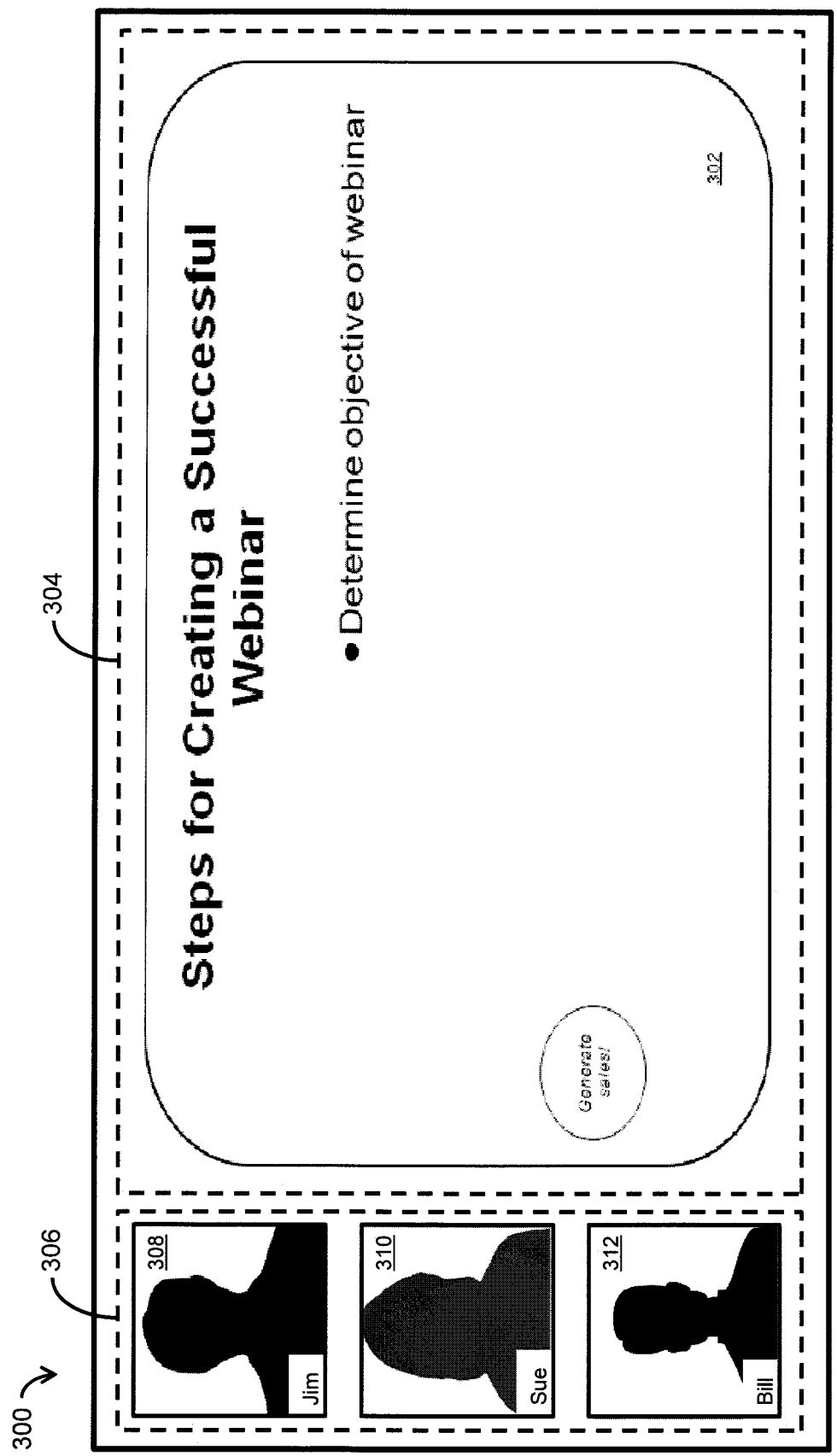
FIG. 3 illustrates a frame that includes a frame area for displaying video and/or static non-video portions of content of an electronic meeting or webinar, and another frame area for displaying video and/or non-video portions of webcam or other content separate from the electronic meeting/webinar content.

FIG. 3 depicts an exemplary frame 300 extracted from the media content recording, including a first frame area 304 (also referred to herein as the "screen-share area") for displaying video and/or static non-video (e.g., slide) portions of the electronic meeting/webinar content, and a second frame area 306 for displaying video and/or non-video portions of webcam or other content separate from the electronic meeting/webinar content. For example, in an online collaborative session, there can be a mixture of slides, webcam feeds, user interfaces (UIs), and so on. As shown in FIG. 3, the first frame area 304 can display a representation 302 of the slide 213 (see FIG. 2a) and/or any other suitable slide portion of the electronic meeting/webinar content. Further, the second frame area 306 can display a plurality of webcam outputs, including a first webcam output 308 for displaying video of a first participant user named "Jim," a second webcam output 310 for displaying video of a second participant user named "Sue," and a third webcam output 312 for displaying video of a third participant user named "Bill." The frame extractor 122 (see FIG. 1b) modifies the content of the frame 300 by identifying the second frame area 306 that displays the webcam videos of the participant users, namely, Jim, Sue, and Bill, and removing the second frame area 306 while retaining the first frame area 304 that displays representations of slides, such as the representation 302 of the slide 213 and/or any other suitable video and/or static non-video (e.g., slide) content pertaining to the electronic meeting/webinar. In this example, the second frame area 306 that displays the webcam outputs 308, 310, 312 can be identified for removal using a heuristic technique or algorithm or any other suitable technique or algorithm. It is noted that other unwanted screen elements occurring within the frame 300 (e.g., a cursor, drop-down menu, video) can also be removed using a heuristic technique or algorithm or any other suitable technique or algorithm.

The frame de-duplicator 124 (see FIG. 1b) de-duplicates the plurality of frames extracted from the media content recording by identifying and removing, from one or more sequences of frames such as the sequence of frames (or slides) 213, 215, 217, 218, 220, 221 (see FIGS. 2a-2f), one or more frames having content that is unchanging relative to the first frame in a respective frame sequence. In other words, the frame de-duplicator 124 removes any consecutive duplicates or copies of the first frame in a respective sequence of frames, while retaining the first frame in the respective sequence of frames. In this example, such identification and removal of consecutive duplicates or copies of a frame can be accomplished by a heuristic technique or algorithm or any other suitable technique or algorithm. For example, such a heuristic technique or algorithm can be configured to generate a gray-scale diff between frame images, and to analyze the gray-scale diff to determine the distribution of changed pixels in various parts of the frame images, focusing primarily on the screen-share area 304 of the frame.

The frame differentiator 126 differentiates the types of deduplicated frames to identify frames that correspond to the "slide type" or other similar type of frames. For example, the frame differentiator 126 can identify at least the frame 213 (see FIG. 2a), the frame 215 (see FIG. 2b), the frame 217 (see FIG. 2c), the frame 218 (see FIG. 2d), the frame 220 (see FIG. 2e), and the frame 221 (see FIG. 2f) as corresponding to the slide type of frames, while discarding frames that correspond to the "video type" and/or any other suitable non-slide type of frames. For example, the differentiation of the types of deduplicated frames can be accomplished by a machine learning algorithm or any other suitable technique or algorithm. Such a machine learning algorithm can be configured to draw an inference with regard to the type of a particular frame to determine whether the frame corresponds to a slide type, a video type, or other type of frame. In this example, one or more training "frame" features (e.g., a user interface (UI), screens on a desktop, a video, slides, slides in a UI) can be determined based on certain training data values, and one or more training "frame" labels (e.g., "UI," "desktop screen," "video," "slide," "UI slide") corresponding to the training frame features can be determined Such training frame features and training frame labels can then be provided to a suitable machine learning algorithm to obtain a predictive model, which can subsequently receive new data values and determine predicted "frame" labels based on the new data values.

The key frame extractor 128 (see FIG. 1b) extracts, from at least the identified slide type of frames 213, 215, 217, 218, 220, 221 (see FIGS. 2a-2f), key frames to be recorded in a slide deck or other similar collection of frames. For example, such extraction of key frames can be facilitated using the AKAZE feature detector algorithm, or any other suitable algorithm or technique. To that end, the key frame extractor 128 removes, from the sequence of frames (or slides) 213, 215, 217, 218 (see FIGS. 2a-2d) in which content is progressively being added, each of the slides 213, 215, 217 (see FIGS. 2a-2c) occurring prior to the last slide 218 (see FIG. 2d) in which the content has reached an unchanging (e.g., steady state) condition. Further, the key frame extractor 128 retains the last slide 218 in the sequence of slides 213, 215, 217, 218, designates the last slide 218 as a "key frame," and associates the timestamp of the first slide 213 in the sequence of slides 213, 215, 217, 218 with the key frame 218. The motivation for associating the timestamp of the first slide 213 in the sequence of slides 213, 215, 217, 218 with the key frame 218 will be discussed later in this example.

In addition, the key frame extractor 128 identifies, from at least the identified slide type of frames 213, 215, 217, 218, 220, 221 (see FIGS. 2a-2f), at least one frame (or slide) that lacks at least some content of its adjacent previous slide, designates each such identified slide as a "key frame" so long as the identified slide is considered or determined not to be a member of a sequence of slides, and maintains the association of the key frame with its original timestamp. As described herein, the slide 220 (see FIG. 2e) lacks content of its adjacent previous slide 218 (see FIG. 2d) corresponding to the first circular/elliptical illustration 262, the second circular/elliptical illustration 264, the third circular/elliptical illustration 266, and the fourth circular/elliptical illustration 268. As further described herein, the slide 221 (see FIG. 2f) lacks content of its adjacent previous slide 220 (see FIG. 2e) corresponding to the title 270, the first bullet point 272, the second bullet point 274, the third bullet point 276, the fourth bullet point 278, and the new directive 280. Because the slide 221 lacks at least some content of its adjacent previous slide 220 (and further because the slide 220 lacks content of its adjacent previous slide 218), the slide 220 is considered or determined not to be a member of a sequence of frames (or slides). The key frame extractor 128 therefore designates the slide 220 as a "key frame," and maintains the association of the key frame 220 with its original timestamp. The key frame extractor 128 also extracts timing information from the media content recording pertaining to the period of time (e.g., from what time to what time) that each key frame is displayed during playback of the media content recording. Once the key frames (e.g., the key frame 218, the key frame 220) have been extracted, the slide deck generator 130 records the respective key frames and their associated timestamps in a slide deck or other similar collection of key frames. Further, while the media content recording is played back and viewed, listened to, and/or otherwise consumed using any suitable media player application, the media player driver 134 interacts with the media player application to display the key frames (e.g., the key frame 218, the key frame 220) as respective clickable thumbnail images in a user interface (UI) of the media player application.

Figure 4A:
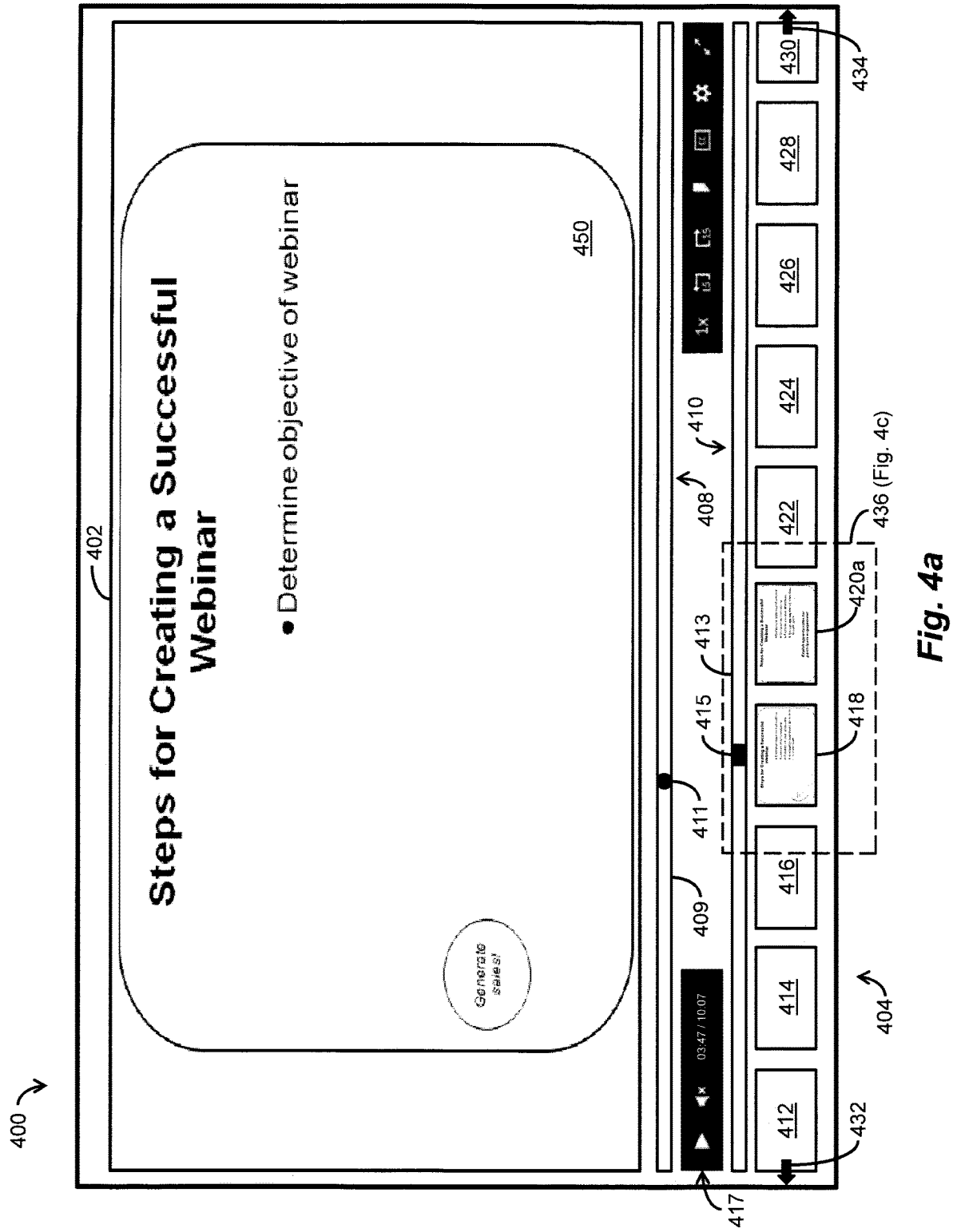
FIGS. 4a and 4b illustrate exemplary user interfaces (UIs) of a media player application that can be displayed on a screen of a participant client device in communication with the session server of FIG. 1b, in which each user interface (UI) includes a series of clickable thumbnail images representing key frames in the slide presentation of FIGS. 2a-2f.
Figure 4B:
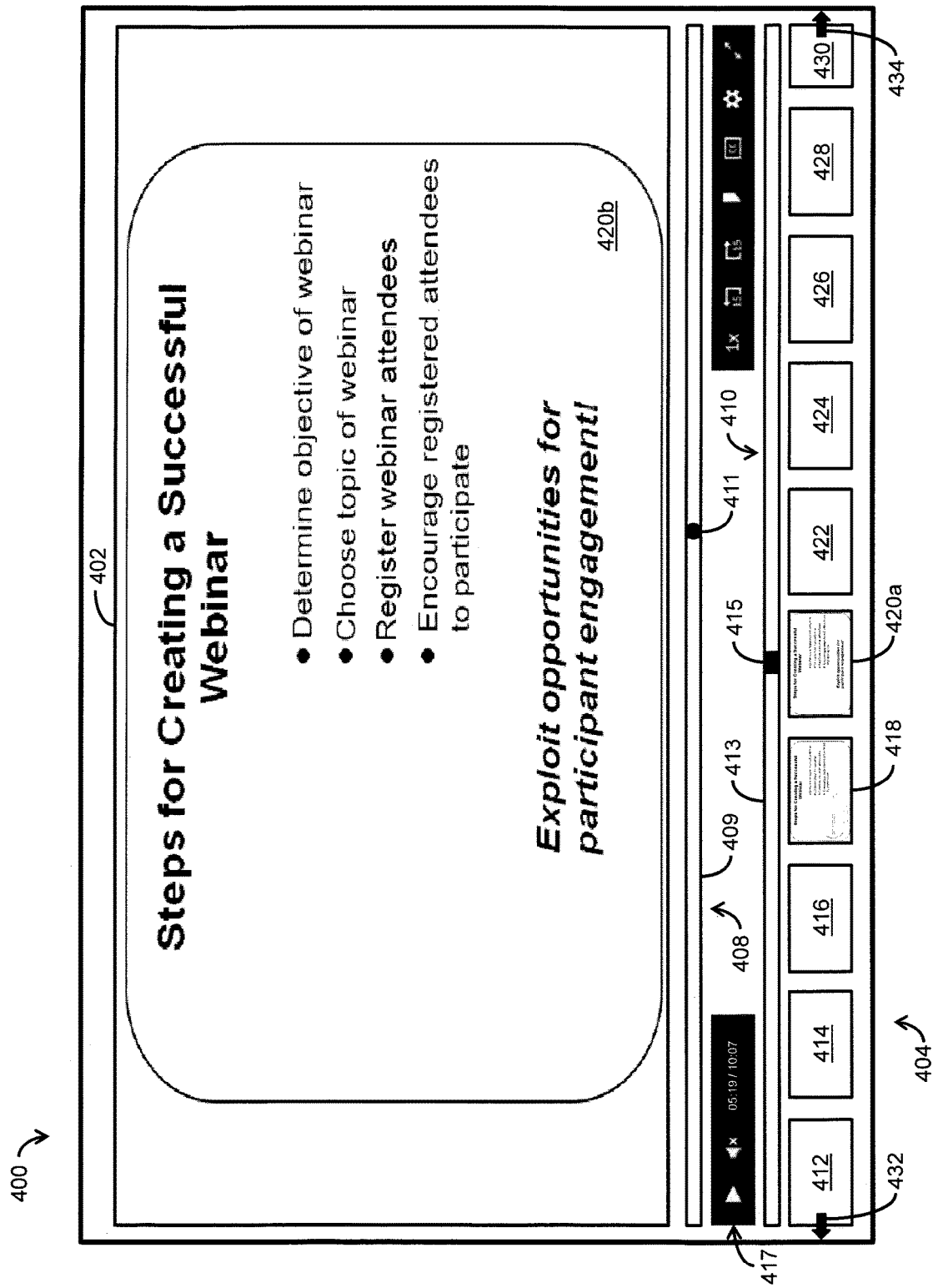

FIGS. 4a and 4b depict an exemplary UI 400 of a media player application, which can be displayed on a screen (e.g., the screen 108a, 110a, 112a, or 114a) of the participant client device 102.1. As shown in FIGS. 4a and 4b, the UI 400 includes a screen area 402, a series of thumbnail images 404 representing key frames of a slide presentation, and a video scrubber bar 408. The screen area 402 can display representations of slides in the slide presentation and/or any other suitable video and/or static non-video (e.g., slide) content pertaining to the electronic meeting/webinar. For example, the screen area 402 can display a representation 450 (see FIG. 4a) of the slide 213 (see FIG. 2a), a representation 420b (see FIG. 4b) of the slide 220 (see FIG. 2e), and/or any other suitable representation of a slide portion of the electronic meeting/webinar content. The video scrubber 408 includes a progress bar 409 with a handle 411 for indicating, along the progress bar 409, the progress of the media content recording during playback. The key frames in the slide presentation represented by the series of thumbnail images 404 can include at least a key frame 412, a key frame 414, a key frame 416, a key frame 418, a key frame 420a, a key frame 422, a key frame 424, a key frame 426, a key frame 428, and a key frame 430. Within the UI 400 (see FIGS. 4a and 4b), a participant user (e.g., Jim, Sue, Bill; see FIG. 3) can click on an arrow 432 to scroll through and/or access one or more key frames (if any) occurring prior to the key frame 412, as well as click on an arrow 434 to scroll through and/or access one or more key frames (if any) occurring subsequent to the key frame 430. In this example, the UI 400 further includes a key frame locator 410 having a locator bar 413 with a handle 415 for navigating the thumbnail images 404 to selected ones of the respective key frames.

Figure 4C:
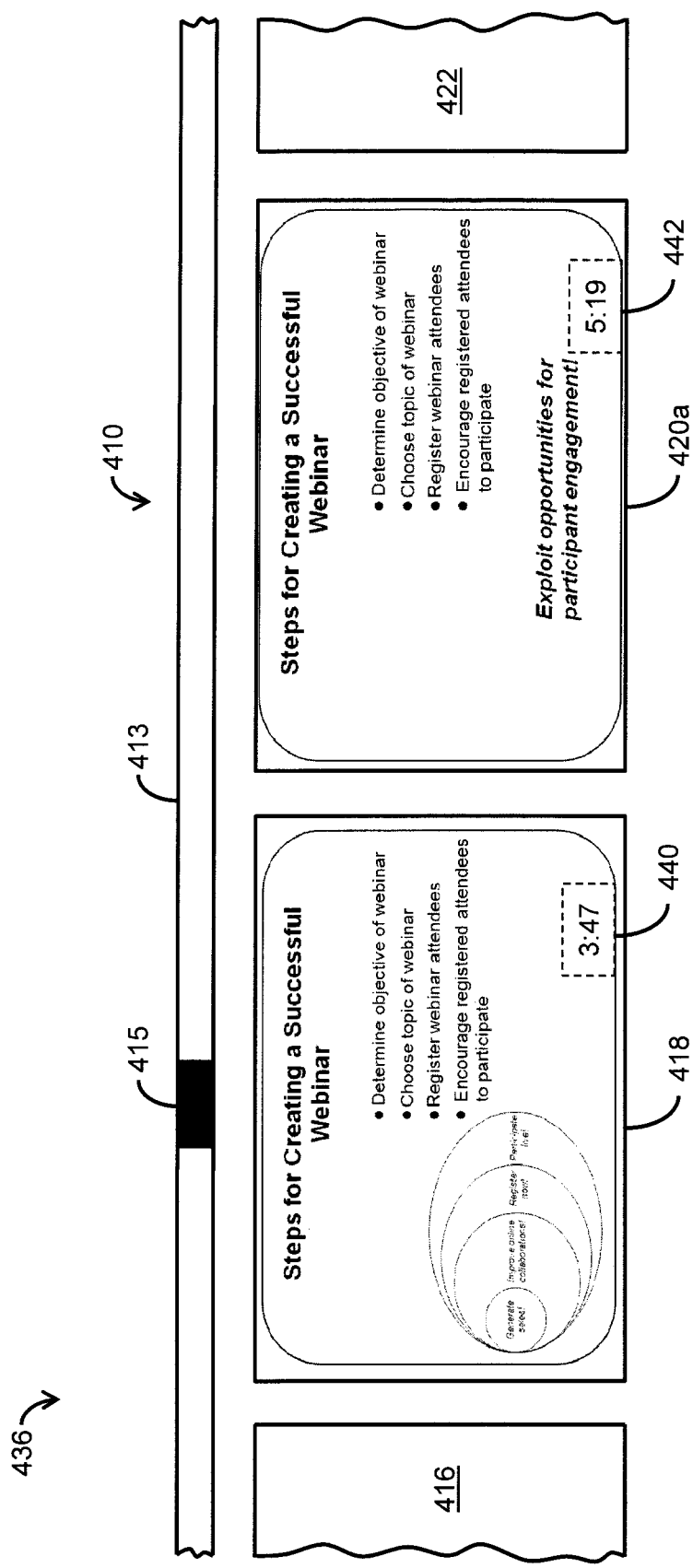
FIG. 4c illustrates a detailed view of a portion of the series of clickable thumbnail images of FIGS. 4a and 4b, as well as a key frame locator bar and handle configured to navigate the series of clickable thumbnail images.

FIG. 4c depicts a detailed view of the key frame 418 and the key frame 420a, each of which is represented and included among the series of thumbnail images 404 (see FIGS. 4a and 4b). In this example, the key frame 418 corresponds to a representation of the slide 218 (see FIG. 2d), and the key frame 420a corresponds to a representation of the slide 220 (see FIG. 2e). As described herein, the key frame extractor 128 can function to retain the last slide 218 in the sequence of slides 213, 215, 217, 218, to designate the last slide 218 as a "key frame," and to associate the timestamp of the first slide 213 in the sequence of slides 213, 215, 217, 218 with the key frame 218. In this example, the timestamp of the first slide 213 corresponds to the time "03:47." As shown in phantom in FIG. 4c, for purposes of illustration, a timestamp 440 corresponding to the time 03:47 is associated with the key frame 418. As further described herein, the key frame extractor 128 can function to designate the slide 220 as a "key frame," and to maintain the association of the key frame 220 with its original timestamp. In this example, the original timestamp of the key frame 220 corresponds to the time "05:19." As further shown in phantom in FIG. 4c, for purposes of illustration, a timestamp 442 corresponding to the time 05:19 is associated with the key frame 420a.

To quickly and more efficiently access desired slide presentation content contained in the media content recording, a participant user can click on or otherwise select a key frame represented by one of the series of thumbnail images 404 in the UI 400, using a mouse, a trackpad, a keyboard, or any other suitable input device of his or her participant client device (e.g., the participant client 102.1; see FIG. 1a). For example, the participant user can click on the thumbnail image of the key frame 418, which corresponds to a representation of the slide 218 (see FIG. 2d). As described herein, the key frame 418 is associated with the timestamp 03:47 of the first slide 213 (see FIG. 2a) in the sequence of slides 213, 215, 217, 218. The participant user's clicking on the thumbnail image of the key frame 418 can therefore cause the representation 450 (see FIG. 4a) of the first slide 213 to be displayed in the screen area 402 of the UI 400 at the time in the media content recording corresponding to the timestamp 03:47. Likewise, the participant user can click on the thumbnail image of the key frame 420a, which corresponds to a representation of the slide 220 (see FIG. 2e). As described herein, the key frame 420a is associated with the timestamp 05:19. The participant user's clicking on the thumbnail image of the key frame 420a can therefore cause the representation 420b (see FIG. 4b) of the slide 220 to be displayed in the screen area 402 at the time in the media content recording corresponding to the timestamp 05:19.

Accordingly, by clicking on the thumbnail image of the key frame 418, which represents the unchanging (e.g., steady state) condition of the slide 218 in the sequence of slides 213, 215, 217, 218, the participant user can quickly and more efficiently access the representation 450 (see FIG. 4a) of the first slide 213 in the respective sequence of slides. Likewise, by clicking on the thumbnail image of the key frame 420a, the participant user can quickly and more efficiently access the representation 420b (see FIG. 4b) of the slide 220. Alternatively or in addition, the participant user can click-and-drag the handle 415 of the locator bar 413 to navigate the thumbnail images 404 to a selected one of the key frames 412, 414, 416, 418, 420a, 422, 424, 426, 428, 430, thereby causing a representation of a slide corresponding to or associated with the selected key frame to be displayed in the screen area 402 of the UI 400. Whereas the video scrubber 408 provides time-based navigation of video frames in a media content recording, the key frame locator 410 is configured to provide frame-based navigation of key frames in the media content recording. Once a desired slide representation is displayed in the screen area 402, the participant user can click on a "play" icon 417 (see FIG. 4a) to commence playback of the media recording content, starting from the time corresponding to the timestamp associated with the selected key frame.

Figure 5A:
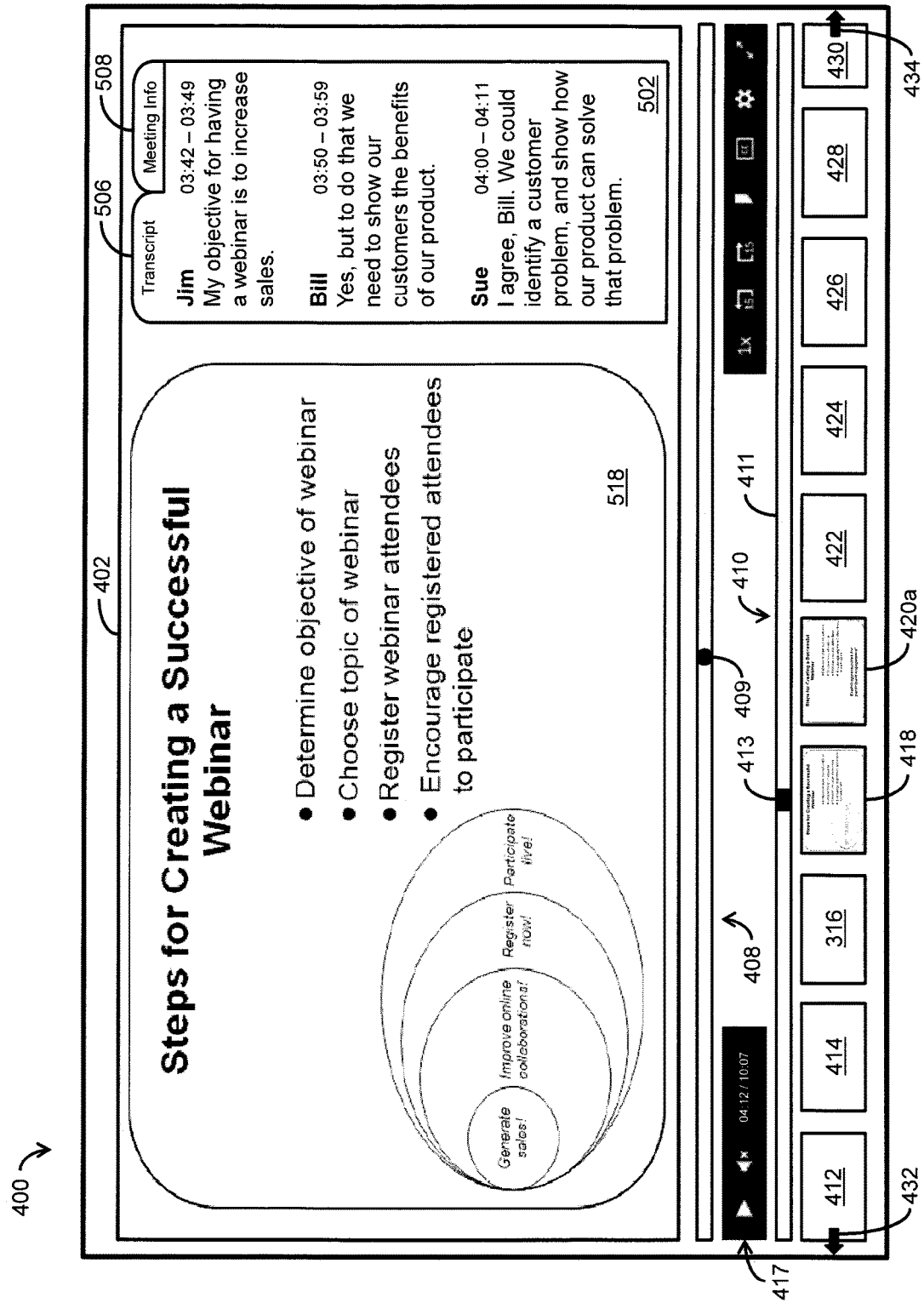
FIG. 5a illustrates an exemplary UI of a media player application that includes the series of clickable thumbnail images of FIGS. 4a and 4b, as well as a transcript of words spoken by participant users during display of a corresponding frame in the slide presentation of FIGS. 2a-2f.

FIG. 5a depicts the UI 400 of the media player application, in which the screen area 402 displays a representation of a slide in a slide presentation (e.g., a representation 518 of the slide 218; see FIG. 2d), as well as a transcript tab 506 for accessing a transcript 502, and a meeting info tab 508 for accessing information ("Meeting Info") pertaining to the electronic meeting/webinar. The transcript generator 132 generates the transcript 502 by converting words spoken by one or more participant users (e.g., Jim, Sue, Bill; see FIG. 3) to text (e.g., speech-to-text conversion). As shown in FIG. 5a, the transcript 502 includes a transcription into text of words spoken by the participant users (e.g., Jim, Sue, Bill; see FIG. 3) during display of the representation 518 of the slide 218 in the screen area 402. For example, the UI 400 can be configured by a participant user to display the transcript tab 506 for accessing the transcript 502 and the meeting info tab 508 for accessing the meeting information via a settings menu (not shown) of the media player application. Further, a participant user can click on the transcript tab 506 to display the transcript 502, which includes words spoken by the participant user, Jim, during the time of the media content recording ranging from 03:42 to 03:49 (e.g., "My objective for having a webinar is to increase sales"). The transcript 502 further includes words spoken by the participant user, Bill, during the time of the media content recording ranging from 03:50 to 03:59 (e.g., "Yes, but to do that we need to show our customers the benefits of our product"), and words spoken by the participant user, Sue, during the time of the media content recording ranging from 04:00 to 04:11 (e.g., "I agree, Bill. We could identify a customer problem, and show how our product can solve that problem"). It is noted that the timing information extracted from the media content recording by the key frame extractor 128 can be used to facilitate the association of the words spoken by each participant user with the displayed slide representation. It is further noted that transcripts corresponding to other respective frames or slides included in the media content recording can be displayed in the screen area 402 of the UI 400 in a similar fashion.

Figure 5B:
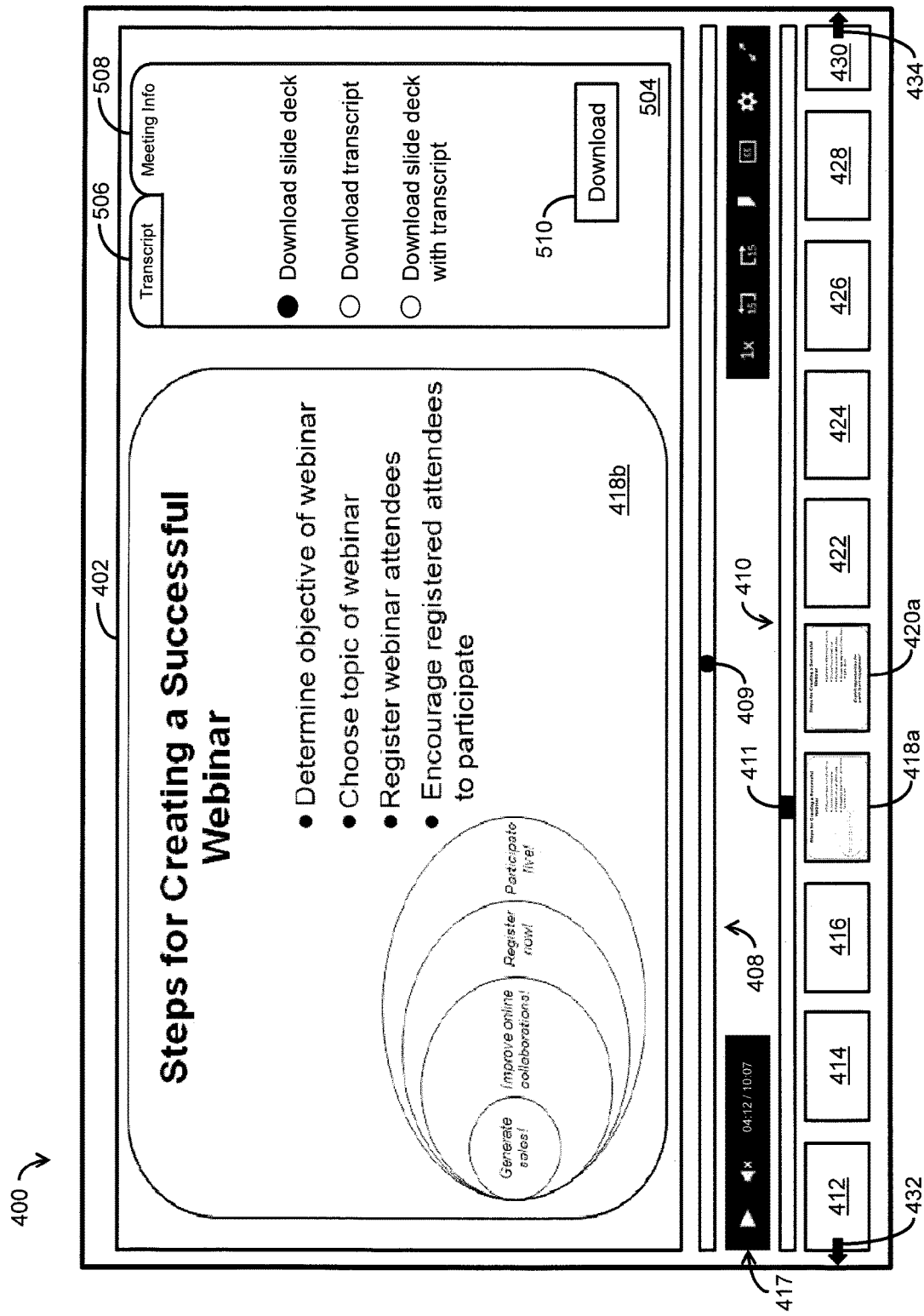
FIG. 5b illustrates the UI of FIG. 5a, including an exemplary download mechanism for downloading copies of the key frames in the slide presentation of FIGS. 2a-2f (e.g., a slide deck), downloading a copy of a transcript associated with the slide deck, or downloading a copy of the slide deck along with the associated transcript.

In addition, a participant user can click on the meeting info tab 508 to display an exemplary download mechanism 504 for downloading information (e.g., a slide deck, transcript) pertaining to the electronic meeting/webinar. As shown in FIG. 5*b*, for example, the download mechanism 504 can include a first radio button with the legend, "Download slide deck," a second radio button with the legend, "Download transcript," and a third radio button with the legend, "Download slide deck with transcript." Having selected one of the first, second, and third radio buttons of the download mechanism 504, the participant user can click on a "download" button 510 to cause the document generator 136 to generate a desired slide deck and/or transcript, and download of the desired slide deck and/or transcript to his or her participant client device. For example, a participant user's clicking on the download button 510 can cause the document generator 136 to generate a document in the PDF format, the PowerPoint format, or any other suitable format. Further, the participant user can save or print out a copy of the document that contains the slide deck, the transcript, or the slide deck with the transcript for future reference or review.

The user interaction analyzer 138 performs the function of analyzing user interaction data for obtaining insights into participant user engagement with the electronic meeting or webinar. In this example, such user interaction data can include information pertaining to which window had focus while certain key frames in the slide deck were being displayed during the electronic meeting/webinar. In this example, such information can be obtained by monitoring user generated inputs (e.g., mouse inputs, trackpad inputs, keyboard inputs), and can include an identification of the key frame(s) being displayed while the electronic meeting/webinar window had focus, how long the electronic meeting/webinar window had focus while the key frame(s) were being displayed, an identification of any other window(s) having focus while the key frame(s) were being displayed, how long the other window(s) had focus while the key frame(s) were being displayed, and so on. The user interaction analyzer 138 can use such information to generate user engagement scores, which, in turn, can be used to measure and/or chart participant user engagement with the content of the slide deck.

Figure 6:
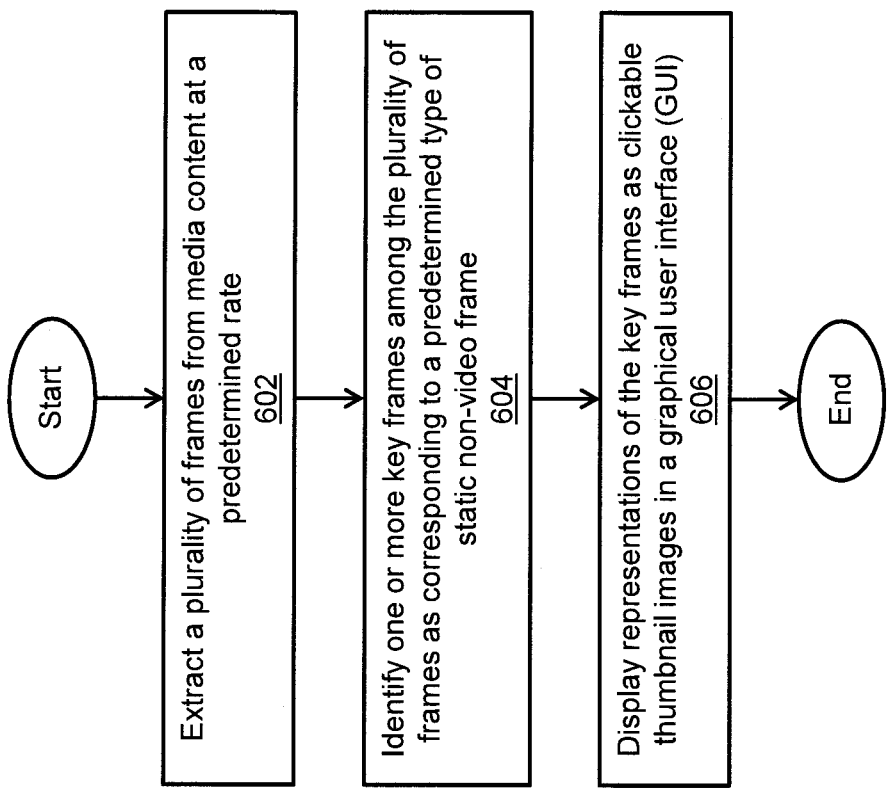
FIG. 6 is a flow diagram of an exemplary method of performing key frame extraction, recording, and navigation in collaborative video presentations.

An exemplary method of performing key frame extraction, recording, and navigation in collaborative video presentations is described below with reference to FIG. 6. As depicted in block 602, a plurality of frames is extracted from media content at a predetermined rate. As depicted in block 604, one or more key frames among the plurality of frames are identified as corresponding to a predetermined type of static non-video frame. As depicted in block 606, representations of the key frames are displayed as clickable thumbnail images in a graphical user interface (GUI).

Having described the above illustrative embodiments of techniques for performing key frame extraction, recording, and navigation in collaborative video presentations, other alternative embodiments, and/or variations of or additions to the above illustrative embodiments can be made. For example, it was described herein how participant users can quickly and more efficiently access desired slide presentation content contained in a media content recording. As an alternative or addition to the above illustrative embodiments, the disclosed techniques can be employed on media content produced, stored, and/or recorded while an electronic meeting or webinar is in-progress. For example, the disclosed techniques can be used to identify incoming key frames, and a software application separate from the one used to run the electronic meeting/webinar can be used to display the identified key frames as clickable thumbnail images for navigation.

It was further described herein that the user interaction analyzer 138 can employ user interaction data to generate user engagement scores, which, in turn, can be employed to measure and/or chart participant user engagement with the content of a slide deck. As an alternative or addition to the above illustrative embodiments, the memory 120 (see FIG. 1*b*) can further accommodate a specialized software application or construct configured to perform the function of generating an abridged version of a media content recording, which includes only those portions of the media content that evidenced a high level of participant user engagement, as indicated by the user engagement scores.

As a further alternative or addition to the above illustrative embodiments, a chaptering feature can be provided using timestamps associated with the respective key frames, tagged video and/or static non-video content of the media content recording, textual content of the respective key frames, and so on. Such timestamps, tagged content, and/or textual content of the respective key frames can be used to determine how to chapterize key frames of a slide presentation or other similar presentation such that certain ones of the key frames are grouped together in a meaningful and logical fashion.

Although features are shown and described herein with reference to particular illustrative embodiments hereof, such features may be included and hereby are included in any of the disclosed embodiments and their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, acts, elements, or aspects of something in an open-ended fashion. Also, as used herein and unless a specific statement is made to the contrary, the word "set" or "subset" means one or more of something. This is the case regardless of whether the phrase "set of" or "subset of" is followed by a singular or plural object, and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain embodiments are disclosed herein, it is understood that these are provided by way of example only, and that the disclosed systems and methods are not limited to these particular embodiments.

While various embodiments of the present disclosure have been particularly shown and described, it will be understood by those skilled in the art that various changes in form and details may be made therein without departing from the scope of the present disclosure, as defined by the appended claims.

What is claimed is:

1. A computer-implemented method of providing frame-based navigation of key frames obtained from media content, comprising:

extracting a plurality of frames from the media content at a predetermined rate;

identifying a plurality of key frames from among the plurality of frames as corresponding to a predetermined type of static non-video frame;

displaying representations of the identified key frames as a series of clickable thumbnail images in a graphical user interface (GUI), the plurality of frames including a plurality of frame sequences, at least one respective clickable thumbnail image corresponding to a last frame in a respective frame sequence from among the plurality of frame sequences;

associating a first timestamp of a first frame in the respective frame sequence with the last frame in the respective frame sequence without maintaining an association of the last frame with its original timestamp, each of the first frame and the last frame has having the first timestamp; and in response to a user's clicking on the respective clickable thumbnail image corresponding to the last frame having the first timestamp, navigating to the first frame in the respective frame sequence and displaying, in a screen area of the GUI, the first frame in the respective frame sequence.

2. The computer-implemented method of claim 1 further comprising:

recording each identified key frame in a slide deck.

3. The computer-implemented method of claim 2 further comprising:

downloading a copy of the slide deck.

4. The computer-implemented method of claim 2 further comprising:

displaying each identified key frame in the slide deck as one of the clickable thumbnail images in the GUI.

5. The computer-implemented method of claim 4 wherein the identified key frame is not a member of any of the plurality of frame sequences, and wherein the method further comprises:

in response to a user's clicking on the respective clickable thumbnail image, displaying the identified key frame in a screen area of the GUI.

6. The computer-implemented method of claim 1 wherein each respective frame from among the plurality of frames includes a first frame area for displaying one or more of video and static non-video portions of the media content, and a second frame area for displaying one or more of video and non-video portions of content separate from the media content, and wherein the method further comprises:

removing the second frame area from each respective frame from among the plurality of frames while retaining the first frame area in the respective frame.

7. The computer-implemented method of claim 6 further comprising:

de-duplicating the plurality of frames by removing, from each respective frame sequence from among the plurality of frame sequences, consecutive duplicates or copies of the first frame in the respective frame sequence while retaining the first frame in the respective frame sequence.

8. The computer-implemented method of claim 7 wherein the deduplicated plurality of frames include multiple types of frames, and wherein the identifying of the one or more key frames from among the plurality of frames as corresponding to the predetermined type of static non-video frame includes differentiating the multiple types of frames to identify one or more frames from among the de-duplicated plurality of frames that correspond to the predetermined type of static non-video frame.

9. The computer-implemented method of claim 8 further comprising:

discarding one or more frames from among the de-duplicated plurality of frames that do not correspond to the predetermined type of static non-video frame.

10. The computer-implemented method of claim 8 further comprising:

extracting the key frames identified as corresponding to the predetermined type of static non-video frame from the deduplicated plurality of frames.

11. The computer-implemented method of claim 10 wherein the extracting of the key frames include removing, from each respective frame sequence from among one or more frame sequences in which content is progressively being added, each frame occurring prior to the last frame in the respective frame sequence in which the content has reached a steady state condition.

12. The computer-implemented method of claim 10 wherein the extracting of the key frames include identifying, from the plurality of frames as corresponding to the predetermined type of static non-video frame, at least one frame that lacks at least some content of its adjacent previous frame, and designating each frame so identified as a key frame so long as the identified frame is not a member of a frame sequence.

13. The computer-implemented method of claim 12 further comprising:

maintaining an association of the identified frame with its original timestamp.

14. A system for providing frame-based navigation of key frames obtained from media content, comprising:
a memory; and
processing circuitry configured to execute program instructions out of the memory to:
extract a plurality of frames from the media content at a predetermined rate;
identify a plurality of key frames from among the plurality of frames as corresponding to a predetermined type of static non-video frame;
display representations of the identified key frames as a series of clickable thumbnail images in a graphical user interface (GUI), the plurality of frames including a plurality of frame sequences, at least one respective clickable thumbnail image corresponding to a last frame in a respective frame sequence from among the plurality of frame sequences;
associate a first timestamp of a first frame in the respective frame sequence with the last frame in the respective frame sequence without maintaining an association of the last frame with its original timestamp, each of the first frame and the last frame having the first timestamp; and
in response to a user's clicking on the respective clickable thumbnail image corresponding to the last frame having the first timestamp, navigate to the first frame in the respective frame sequence and display, in a screen area of the GUI, the first frame in the respective frame sequence.

15. The system of claim 14 wherein the processing circuitry is further configured to execute the program instructions out of the memory to record each identified key frame in a slide deck, and download a copy of the slide deck.

16. The system of claim 15 wherein the processing circuitry is further configured to execute the program instructions out of the memory to display each identified key frame in the slide deck as a respective clickable thumbnail image in the GUI.

17. A computer program product including a set of non-transitory, computer-readable media having instructions that, when executed by processing circuitry of a computerized apparatus, cause the processing circuitry to perform a method of providing frame-based navigation of key frames obtained from media content, wherein the method comprises:
extracting a plurality of frames from the media content at a predetermined rate;
identifying a plurality of key frames from among the plurality of frames as corresponding to a predetermined type of static non-video frame;
displaying representations of the identified key frames as a series of clickable thumbnail images in a graphical user interface (GUI), the plurality of frames including a plurality of frame sequences, at least one respective clickable thumbnail image corresponding to a last frame in a respective frame sequence from among the plurality of frame sequences;
associating a first timestamp of a first frame in the respective frame sequence with the last frame in the respective frame sequence without maintaining an association of the last frame with its original timestamp, each of the first frame and the last frame having the first timestamp; and
in response to a user's clicking on the respective clickable thumbnail image corresponding to the last frame having the first timestamp, navigating to the first frame in the respective frame sequence and displaying, in a screen area of the GUI, the first frame in the respective frame sequence.

18. The computer program product of claim 17 wherein the method further comprises:
displaying each identified key frame in the slide deck as a respective clickable thumbnail image in the GUI.

\* \* \* \* \*